Dec. 5, 1939.    C. D. LOWRY    2,182,480
DIVISION AND CORNER BAR CONSTRUCTION
Filed Oct. 14, 1937
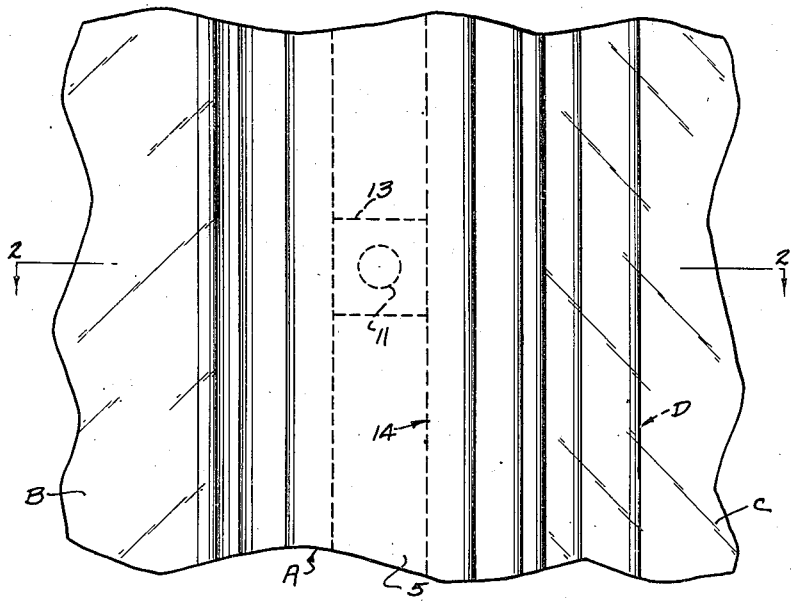
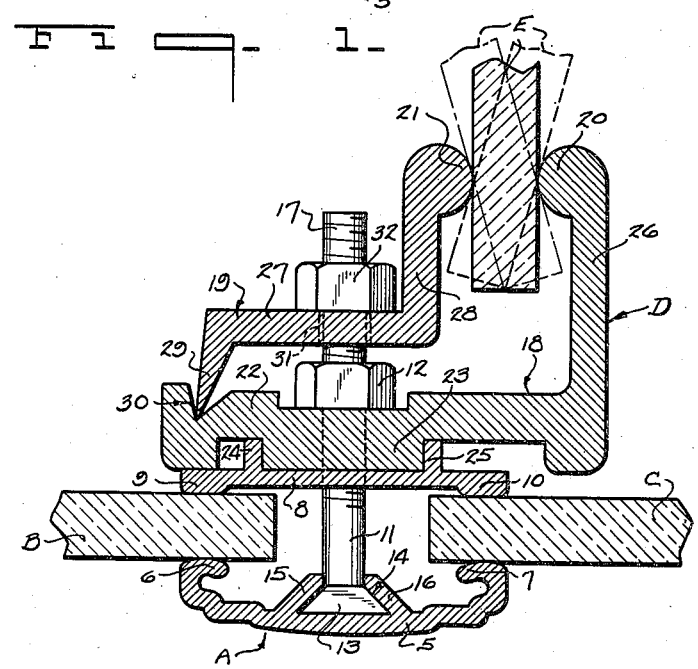
Inventor
CLYDE D. LOWRY.
By 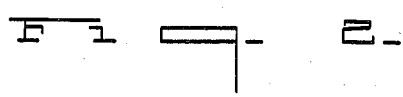
Attorney Patented Dec. 5, 1939

2,182,480

UNITED STATES PATENT OFFICE 2,182,480

DIVISION AND CORNER BAR CONSTRUCTION

Clyde D. Lowry, Toledo, Ohio, assignor to Libbey-Owens-Ford Glass Company, Toledo, Ohio, a corporation of Ohio Application October 14, 1937, Serial No. 168,933

14 Claims. (Cl. 189—78)

This invention relates to sash or store front constructions and particularly to the provision of an improved division and corner bar.

It is the primary object of the invention to provide a division and corner bar construction of the type known in the trade as a three-way bar which is designed to connect two sheets of glass disposed in the same or substantially the same plane with a third sheet of glass arranged in angular relation relative to the other two sheets.

Another object of the invention is the provision of a three-way bar construction of maximum simplicity, efficiency, and ease of assembly so that when the several parts thereof are properly assembled, a firm, rigid connection will be provided between the three sheets of glass, thereby affording a strong reinforcement of the store front or show window to thus cause it to successfully withstand any pressure and vibrations to which it may be subjected.

Other objects and advantages of the invention will become more apparent during the course of the following description when taken in connection with the accompanying drawing.

In the drawing wherein like numerals are employed to designate like parts throughout the same:

Fig. 1 is a face view of a store front or show window having associated therewith a division and corner bar constructed in accordance with the invention; and Fig. 2 is a section taken substantially on line 2—2 of Fig. 1.

With reference to the drawing, the three-way bar herein provided consists generally of a division bar A for connecting together the two sheets or panes of glass B and C disposed in the same or substantially the same plane and a corner bar D associated with said division bar A for connecting a third sheet or pane of glass E in angular relation with respect to the two sheets or panes of glass B and C.

The division bar A includes an outer glass retaining member 5 spanning the space between the adjacent edges of the glass sheets B and C and provided at its outer side edges with the inturned glass contacting portions or flanges 6 and 7 which engage the outer faces of the two sheets B and C respectively. The division bar also includes an inner glass retaining member 8 extending between the two sheets of glass B and C and provided along its outer side edges with the glass contacting portions or flanges 9 and 10 which engage the inner faces of the glass sheets B and C respectively in opposed relation to the glass contacting portions or flanges 6 and 7 of the outer retaining member 5.

The outer and inner glass retaining members 5 and 8 are secured together in clamping relation with the glass sheets B and C by means of a plurality of clamping bolts 11 and nuts 12 threaded thereon. Each clamping bolt 11 is provided at its outer end with a head 13 received in a channel 14 formed between the rearwardly converging flanges 15 and 16 provided upon the inner side of the outer retaining member 5, said bolts projecting rearwardly through openings in the inner retaining member 8 and being threaded as at 17 to receive the nuts 12 thereon.

The corner bar D is carried by the division bar A and consists of the outer and inner glass retaining sections 18 and 19 provided at their outer ends with the glass contacting portions 20 and 21 respectively which engage the outer and inner faces of the glass sheet E. The glass contacting portions 20 and 21 of the outer and inner retaining sections 18 and 19 are in the form of rounded beads so that the glass sheet E can be disposed either at right angles to the glass sheets B and C, as shown by the full lines in Fig. 2, or at different angles with respect thereto as indicated by the broken lines. The outer retaining section 18 is substantially L-shaped in cross section and comprises a base 22 extending parallel with and seated upon the inner retaining member 8 of the division bar A, said base being provided with a body portion 23 which is received between spaced ribs 24 and 25 formed on said inner retaining member 8 and having openings through which the clamping bolts 11 are adapted to pass. The nuts 12 are threaded upon bolts 11 inwardly of the body portion 23 and serve to rigidly secure the retaining section 18 to the inner retaining member 8 of division bar A and at the same time secure the outer and inner members 5 and 8 of the division bar in clamping relation with the glass sheets B and C. The base 22 is provided at its outer edge with a leg 26 disposed at right angles with respect thereto and provided at its outer end with the glass contacting bead 20.

The inner retaining section 19 comprises a body portion 27 arranged substantially parallel with the base 22 of the outer retaining section 18, said body portion 27 being provided at its outer edge with a right angularly disposed leg 28 substantially parallel with the leg 26 of the outer section 18 and having at its outer end the glass contacting bead 21. The body portion 27 is formed along its inner edge with a flange 29 extending substantially parallel with the leg 28 but in the opposite direction and received within a groove 30 formed in the base 22 of outer section 18 whereby to provide a fulcrum upon which the inner section 19 is adapted to rock. The flange 29 is beveled to provide, in effect, a knife edge fulcrum seated in the sharp groove 30 which functions to center the knife edge fulcrum.

The body portion 27 of the inner retaining section 19 is provided with transverse slots 31 also adapted to receive therethrough the clamping bolts 11 upon the outer ends of which are threaded the nuts 32. Upon tightening of the nuts 32, the inner section 19 will be rocked upon its fulcrum 29 to move the outer end thereof into engagement with the glass sheet E whereby the said sheet will be firmly clamped between the glass contacting beads 20 and 21 of the outer and inner sections 18 and 19 respectively.

In assembling the three-way bar above described, the clamping bolts 11 are first associated with the outer retaining member 5 of the division bar A, after which the said bolts are passed between the two sheets of glass B and C and through the inner retaining member 8 of said division bar as well as through the base 22 of the outer retaining section 18 of corner bar D. The nuts 12 are then threaded upon the bolts 11 and tightened down to draw the outer and inner retaining members 5 and 8 together in clamping relation to the two sheets of glass B and C. The nuts 12 also serve to rigidly secure the outer retaining section 18 of the corner bar D to the inner retaining member 8 of division bar A. The inner retaining section 19 of corner bar D is then slipped over the ends of the clamping bolts 11 and the flange 29 seated in the groove 30. The nuts 32 are then threaded upon the clamping bolts 11 and tightened down to cause the inner section 19 to pivot or rock upon its fulcrum 29 to move the outer end thereof into engagement with the glass sheet E.

The two sheets of glass B and C are therefore rigidly held in the same plane by the division bar A, while the third sheet of glass E is firmly maintained in the desired angular relation with respect to the glass sheets B and C by the corner bar D. The pressure of the retaining members 5 and 8 upon the glass sheets B and C is controlled by the nuts 12 while the pressure of the retaining sections 18 and 19 upon the glass sheet E is controlled by the nuts 32. The use of separate tensioning means (nuts 12 and 32) for the division bar A and corner bar D allows for the correct pressure to be placed on the glass sheets held thereby regardless of their thickness.

Another important and desirable feature of the invention is that the glass retaining members 5 and 8 constituting the division bar A may be used as a division bar independently of the corner bar sections 18 and 19 and that these sections can be readily associated with the division bar when a three-way bar is desired. Consequently, it will not be necessary for a jobber to carry a complete expensive three-way bar in stock but instead it is only necessary for him to add to his division bar stock the two corner bar sections 18 and 19 and with these sections he can readily assemble a three-way bar when the need arises.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The combination with a division bar including inner and outer members for clamping therebetween two sheets of glass disposed in substantially the same plane, of a corner bar for connecting the two sheets of glass with a third sheet of glass arranged at an angle relative thereto, comprising an outer section carried by the inner member of said division bar and engaging the outer face of the third sheet of glass, and an inner section mounted upon said outer section and being independent of the inner member of said division bar, said inner section engaging the inner face of the third sheet of glass.

2. The combination with a division bar including inner and outer members for clamping therebetween two sheets of glass disposed in substantially the same plane, of a corner bar for connecting the two sheets of glass with a third sheet of glass arranged at an angle relative thereto, comprising an outer section rigidly secured to the inner member of said division bar and engaging the outer face of the third sheet of glass, and an inner section adjustably mounted upon said outer section and being independent of the inner member of said division bar, said inner section engaging the inner face of the third sheet of glass.

3. The combination with a division bar including inner and outer members for clamping therebetween two sheets of glass disposed in substantially the same plane, of a corner bar for connecting the two sheets of glass with a third sheet of glass arranged at an angle relative thereto, comprising a substantially L-shaped outer section rigidly secured to the inner member of said division bar and engaging the outer face of the third sheet of glass, and an inner section fulcrumed upon said outer section and engaging the inner face of the third sheet of glass.

4. The combination with a division bar including inner and outer members for clamping therebetween two sheets of glass disposed in substantially the same plane, of a corner bar for connecting the two sheets of glass with a third sheet of glass arranged at an angle relative thereto, comprising a substantially L-shaped outer section rigidly secured to the inner member of said division bar and engaging the outer face of the third sheet of glass, and an inner section fulcrumed upon said outer section and engaging the inner face of the third sheet of glass, said inner and outer sections being provided at their outer ends with rounded glass contacting portions for securing the third sheet of glass at different angles relative to the two sheets of glass secured by said division bar.

5. The combination with a division bar including inner and outer members for clamping therebetween two sheets of glass disposed in substantially the same plane, of a corner bar for connecting the two sheets of glass with a third sheet of glass arranged at an angle relative thereto, comprising an outer section secured to the inner member of said division bar and engaging the outer face of the third sheet of glass, and an inner section fulcrumed upon said outer section and engaging the inner face of the third sheet of glass, one of said sections having a groove and the other of said sections having a flange fitting in said groove to form the fulcrum.

6. The combination with a division bar including inner and outer members for clamping therebetween two sheets of glass disposed in substantially the same plane, of a corner bar for connecting the two sheets of glass with a third sheet of glass arranged at an angle relative thereto, comprising an outer section rigidly secured to the inner member of said division bar and provided at its outer end with a glass contacting portion engaging the outer face of the third sheet of glass, an inner section fulcrumed at its inner end upon said outer section and provided at its outer end with a glass contacting portion engaging the inner face of the third sheet of glass, and means for connecting said inner section to said outer section and for rocking the same upon its fulcrum.

7. The combination with a division bar including inner and outer members for clamping therebetween two sheets of glass disposed in substantially the same plane, of a corner bar for connecting the two sheets of glass with a third sheet of glass arranged at an angle relative thereto, comprising an outer section rigidly secured to the inner member of said division bar and provided at its outer end with a glass contacting portion engaging the outer face of the third sheet of glass, an inner section fulcrumed at its inner end upon said outer section and provided at its outer end with a glass contacting portion engaging the inner face of the third sheet, and means for connecting said inner section to said outer section and for rocking the same upon its fulcrum, the glass contacting portions of said inner and outer sections being rounded to secure the third sheet of glass at different angles relative to the two sheets of glass secured by said division bar.

8. In a sash or store front construction, the combination of an inner glass retaining member, an outer glass retaining member, means for securing said members together in clamping relation with respect to two sheets of glass disposed in substantially the same plane, and means for connecting the two sheets of glass with a third sheet of glass arranged at an angle relative thereto including an outer section seated upon and secured to said inner glass retaining member for engaging the outer face of the third sheet of glass, and an inner section carried by said securing means and fulcrumed upon said outer section for engaging the inner face of the third sheet of glass.

9. In a sash or store front construction, the combination of separate inner and outer glass retaining members arranged at opposite sides of two sheets of glass disposed in substantially the same plane and engaging the adjacent faces thereof for clamping said sheets therebetween, means for connecting the two sheets of glass with a third sheet of glass arranged at an angle relative thereto including separate inner and outer sections engaging the inner and outer faces respectively of the third sheet of glass, and common fastening means for securing said inner and outer glass retaining members and also said inner and outer sections together.

10. In a sash or store front construction, the combination of inner and outer glass retaining members for clamping therebetween two sheets of glass disposed in substantially the same plane, means for connecting the two sheets of glass with a third sheet of glass arranged at an angle relative thereto including a fixed outer section mounted upon said inner glass retaining member and engaging the outer face of the third sheet of glass, an inner section adjustably mounted upon said outer section and being independent of the said inner glass retaining member, said inner section engaging the inner face of the third sheet of glass, and means for securing said inner and outer glass retaining members and also said inner and outer sections together.

11. In a sash or store front construction, the combination of inner and outer glass retaining members for clamping therebetween two sheets of glass disposed in substantially the same plane, means for connecting the two sheets of glass with a third sheet of glass arranged at an angle relative thereto including a fixed outer section mounted upon said inner glass retainer member and provided at its outer end with a glass contacting portion engaging the outer face of the third sheet of glass, an inner section fulcrumed at its inner end upon said outer section and provided at its outer end with a glass contacting portion engaging the inner face of the third sheet of glass, and clamping bolts for securing said inner and outer glass retaining members and also said inner and outer sections together.

12. In a sash or store front construction, the combination of inner and outer glass retaining members for clamping therebetween two sheets of glass disposed in substantially the same plane, means for connecting the two sheets of glass with a third sheet of glass arranged at an angle relative thereto including a fixed outer section mounted upon said inner glass retaining member and provided at its outer end with a glass contacting portion engaging the outer face of the third sheet of glass, an inner section fulcrumed at its inner end upon said outer section and provided at its outer end with a glass contacting portion engaging the inner face of the third sheet of glass, clamping bolts carried by said outer glass retaining member and passing through said inner glass retaining member and also through said inner and outer sections, nuts threaded upon said bolts inwardly of said outer section for securing said section to the inner glass retaining member and for also securing the said outer and inner retaining members in clamping engagement with the glass sheets, and nuts threaded upon said bolts inwardly of said inner section for connecting said section to said outer section and for rocking the same upon its fulcrum.

13. In a sash or store front construction, the combination of inner and outer glass retaining members for clamping therebetween two sheets of glass disposed in substantially the same plane, means for connecting the two sheets of glass with a third sheet of glass arranged at an angle relative thereto including a fixed outer section mounted upon said inner glass retaining member and provided at its outer end with a glass contacting portion engaging the outer face of the third sheet of glass and adjacent its inner end with a groove, an inner section having a flange at its inner end received in said groove and a glass contacting portion at its outer end engaging the inner face of the third sheet of glass, clamping bolts carried by said outer glass retaining member and passing through said inner glass retaining member and also through said inner and outer sections, the said inner section having slots for receiving said bolts therethrough, nuts threaded upon said bolts inwardly of said outer section for securing said section to the inner glass retaining member and for also securing the said outer and inner retaining members in clamping engagement with the glass sheets, and nuts threaded upon said bolts inwardly of said inner section for connecting said section to said outer section and for rocking the same upon said flange.

14. In a sash or store front construction, the combination of inner and outer glass retaining members for clamping therebetween two sheets of glass disposed in substantially the same plane, means for connecting the two sheets of glass with a third sheet of glass arranged at an angle relative thereto including a fixed outer section mounted upon said inner glass retaining member and provided at its outer end with a glass contacting portion engaging the outer face of the third sheet of glass and adjacent its inner end with a groove, an inner section having a flange at its inner end received in said groove and a glass contacting portion at its outer end engaging the inner face of the third sheet of glass, clamping bolts carried by said outer glass retaining member and passing through said inner glass retaining member and also through said inner and outer sections, the said inner section having slots for receiving said bolts therethrough, nuts threaded upon said bolts inwardly of said outer section for securing said section to the inner glass retaining member and for also securing the said outer and inner retaining members in clamping engagement with the glass sheets, and nuts threaded upon said bolts inwardly of said inner section for connecting said section to said outer section and for rocking the same upon said flange, the glass contacting portions of said inner and outer sections being rounded to secure the third sheet of glass at different angles relative to the two sheets of glass secured by said retaining members.

CLYDE D. LOWRY.